US010312782B2

(12) United States Patent
Fahimi et al.

(10) Patent No.: US 10,312,782 B2
(45) Date of Patent: Jun. 4, 2019

(54) DOUBLE STATOR PERMANENT MAGNET MACHINE

(71) Applicant: The Board of Regents, The University of Texas System, Austin, TX (US)

(72) Inventors: Babak Fahimi, Arlington, TX (US); Wei Wang, Dallas, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 964 days.

(21) Appl. No.: 14/318,056

(22) Filed: Jun. 27, 2014

(65) Prior Publication Data

US 2015/0048704 A1  Feb. 19, 2015

Related U.S. Application Data

(63) Continuation-in-part of application No. 13/169,233, filed on Jun. 27, 2011.
(Continued)

(51) Int. Cl.
*H02K 16/04* (2006.01)
*H02K 21/12* (2006.01)
(Continued)

(52) U.S. Cl.
CPC .............. *H02K 16/04* (2013.01); *H02K 21/12* (2013.01); *H02P 6/28* (2016.02); *H02K 1/272* (2013.01); *H02K 1/274* (2013.01); *H02K 1/2706* (2013.01); *H02K 1/278* (2013.01); *H02K 1/2753* (2013.01); *H02K 1/30* (2013.01); *H02K 16/00* (2013.01); *H02K 17/42* (2013.01); *H02K 23/36* (2013.01);
(Continued)

(58) Field of Classification Search
CPC ...... H02K 1/272; H02K 1/274; H02K 1/2706; H02K 1/2753; H02K 1/278; H02K 1/30; H02K 16/00; H02K 17/42; H02K 21/12; H02K 23/36; H02K 23/56; H02K 49/043; H02K 49/046; H02K 49/102; H02K 49/106; H02K 49/108; H02K 49/122
USPC ....... 310/103, 106, 126, 140, 141, 142, 143, 310/144, 145, 146, 168, 261.1, 266
See application file for complete search history.

(56) References Cited

U.S. PATENT DOCUMENTS 3,956,678 A    5/1976  Byrne et al.
4,532,447 A *  7/1985  Cibie .................... H02K 51/00
                                                        310/114

(Continued)

OTHER PUBLICATIONS

Mohammadali Abbasian, et al., "Double-Stator Switched Reluctance Machines (DSSRM): Fundamentals and Magnetic Force Analysis," IEEE Transactions on Energy Conversion, Sep. 2010, pp. 589-597, vol. 25, No. 3.

*Primary Examiner* — Bernard Rojas
*Assistant Examiner* — Rashad H Johnson
(74) *Attorney, Agent, or Firm* — Schultz & Associates, P.C.

(57) ABSTRACT

A double stator permanent magnet machine includes an inner stator having a back iron and a set of inner stator poles connected to the back iron, a rotor having a shaft and a set of segments, each segment having a permanent magnet, adjacent the inner stator and rotatively coupled to the inner stator, an outer stator having a set outer stator poles, adjacent the rotor and rotatively coupled to the rotor, a set of inner windings disposed between each of the inner stator poles, and a set of outer windings disposed between each of the outer stator poles.

22 Claims, 8 Drawing Sheets

Related U.S. Application Data

(60) Provisional application No. 61/867,381, filed on Aug. 19, 2013, provisional application No. 61/358,583, filed on Jun. 25, 2010.

(51) Int. Cl.

| | | |
|---|---|---|
| *H02P 6/28* | (2016.01) | |
| *H02K 1/30* | (2006.01) | |
| *H02K 17/42* | (2006.01) | |
| *H02K 1/27* | (2006.01) | |
| *H02K 23/36* | (2006.01) | |
| *H02K 23/56* | (2006.01) | |
| *H02K 16/00* | (2006.01) | |
| *H02K 49/04* | (2006.01) | |
| *H02K 49/10* | (2006.01) | |

(52) U.S. Cl.
CPC ........... *H02K 23/56* (2013.01); *H02K 49/043* (2013.01); *H02K 49/046* (2013.01); *H02K 49/102* (2013.01); *H02K 49/106* (2013.01); *H02K 49/108* (2013.01)

(56) References Cited

U.S. PATENT DOCUMENTS

| | | | |
|---|---|---|---|
| 4,698,537 A | 10/1987 | Byrne et al. | |
| 4,757,224 A | 7/1988 | McGee et al. | |
| 5,081,388 A | 1/1992 | Chen | |
| 5,111,096 A | 5/1992 | Horst | |
| 5,113,113 A | 5/1992 | Tepavcevic | |
| 5,304,882 A | 4/1994 | Lipo et al. | |
| 5,345,133 A | 9/1994 | Satake | |
| 5,537,019 A | 7/1996 | Van Sistine et al. | |
| 5,545,938 A | 8/1996 | Mecrow | |
| 5,548,173 A | 8/1996 | Stephenson | |
| 5,552,653 A * | 9/1996 | Nose ........................ | H02K 1/14 310/12.22 |
| 5,691,591 A | 11/1997 | McCann | |
| 5,751,089 A * | 5/1998 | Stridsberg .............. | H02K 1/185 310/266 |
| 5,783,893 A * | 7/1998 | Dade ...................... | H02K 16/00 310/114 |
| 5,811,905 A * | 9/1998 | Tang ........................ | H02K 3/28 310/162 |
| 5,814,965 A | 9/1998 | Randall | |
| 5,825,112 A | 10/1998 | Lipo et al. | |
| 5,825,113 A * | 10/1998 | Lipo ...................... | H02K 21/44 310/162 |
| 6,271,616 B1 | 8/2001 | Akemakou | |
| 6,459,185 B1 * | 10/2002 | Ehrhart .................... | H02K 1/20 310/156.35 |
| 6,819,026 B2 * | 11/2004 | Narita .................... | H02K 16/04 310/184 |
| 7,453,176 B2 | 11/2008 | Davison | |
| 7,723,888 B2 | 5/2010 | Petek | |
| 8,544,580 B2 | 10/2013 | Cheng et al. | |
| 8,736,136 B2 | 5/2014 | Lee et al. | |
| 2002/0011811 A1 | 1/2002 | Chen et al. | |
| 2003/0184179 A1* | 10/2003 | Galbraith .............. | H02K 39/00 310/166 |
| 2003/0222617 A1 | 12/2003 | Nakai et al. | |
| 2006/0131986 A1 | 6/2006 | Hsu et al. | |
| 2006/0279155 A1* | 12/2006 | Holtzapple .............. | F01C 1/10 310/168 |
| 2007/0222304 A1 | 9/2007 | Jajtic et al. | |
| 2008/0129244 A1 | 6/2008 | Randall | |
| 2008/0169720 A1* | 7/2008 | Petek ...................... | H02K 16/04 310/156.35 |
| 2008/0197793 A1 | 8/2008 | Randall | |
| 2010/0231062 A1 | 9/2010 | Sykes et al. | |
| 2011/0193507 A1 | 8/2011 | Ramu | |
| 2011/0284300 A1 | 11/2011 | Cheng et al. | |
| 2011/0285238 A1* | 11/2011 | Kusase .................. | H02K 16/04 310/156.48 |
| 2011/0316366 A1 | 12/2011 | Abbasian et al. | |
| 2013/0099618 A1* | 4/2013 | Kusase .................... | H02K 3/28 310/156.56 |

* cited by examiner

DOUBLE STATOR PERMANENT MAGNET MACHINE

CROSS REFERENCE TO RELATED APPLICATION

This application claims priority to U.S. Provisional Application No. 61/867,381 filed Aug. 19, 2013. This application is a continuation in part of U.S. application Ser. No. 13/169,233 filed Jun. 27, 2011, which claims priority to U.S. Provisional Application No. 61/358,583 filed Jun. 25, 2010. Each of the above identified patent applications is incorporated herein by reference in its entirety to provide continuity of disclosure.

FIELD OF THE INVENTION

This invention relates generally to double stator machines, and more particularly to a double stator permanent magnet machine having structural geometries that optimize the distribution of magnetic flux.

BACKGROUND OF THE INVENTION

Conventional switched reluctance machines provide a generally robust structure and low manufacturing cost. However, the majority of the electromagnetic forces used by a conventional switched reluctance machine do not contribute to useful work. Rather, these forces create undesirable vibrations that are a major drawback. Thus, conventional switched reluctance machines have limited industrial applicability. Surface mount permanent magnet synchronous machines offer higher torque density than conventional switched reluctance machines. However, rare earth permanent magnet material is expensive and ineffective placement of the rare earth permanent magnets results in high cost and wasteful use of the permanent magnet material.

For example, U.S. Pat. No. 5,304,882 to Lipo et al discloses a variable reluctance motor with permanent magnet excitation having a single set of stators and a single rotor having permanent magnets. However, the motor in Lipo requires a significant amount of permanent magnet material, thereby making the manufacture of such a motor expensive. Further, the motor is limited by the amount of electromagnetic forces which contribute to rotational motion, thereby limiting the torque density of the motor and its overall efficiency.

Therefore, there is a need for intelligent hybridization of rare earth permanent magnets and effective placement to increase power density at a reduced cost to manufacture. Further, there is a need in the art for a double stator permanent magnet machine in which a higher proportion of the electromagnetic forces generated contributes to motion with a reduced amount of permanent magnet material, thereby lowering the overall cost of manufacture.

SUMMARY

In one embodiment, a double stator permanent magnet machine includes an inner stator, a rotor adjacent the inner stator and rotatively coupled to the inner stator, and an outer stator adjacent the rotor and rotatively coupled to the rotor. The inner stator includes, a back iron, and a set of inner stator poles connected to the back iron. The rotor includes a shaft, and a set of segments, each segment having a permanent magnet. The outer stator includes a set of outer stator poles. A set of inner stator windings are disposed between each of the inner stator poles and a set of outer stator windings are disposed between each of the outer stator poles. A set of phases, each phase including a subset of the set of inner stator windings and a subset of the set of outer stator windings selectively energize the set of phases with a current to rotate the rotor with respect to the inner stator and the outer stator.

In one embodiment, the double stator permanent magnet machine operates as a motor generating a reluctance torque and a reaction torque at a ratio of at least 1:3.

In another embodiment, the double stator permanent magnet machine operates as a generator by connecting a load to the shaft of the rotor.

In another embodiment, a method for operating a double stator permanent magnet machine is disclosed. In this embodiment, the method includes the steps of energizing each phase of the set of phases with a first current as a flux linkage of each phase increases and energizing each phase of the set of phases with a second current, opposite in polarity from the first current, as the flux linkage of each phase decreases. Reaction torque produced by each phase is maximized and reluctance torque produced by each phase is minimized, only contributing to torque ripple.

BRIEF DESCRIPTION OF THE DRAWINGS

The disclosed embodiments will be described with reference to the accompanying drawings. Like pieces in different drawings are designated by same number.

DETAILED DESCRIPTION

The structure of a double stator permanent magnet machine according to some embodiments of the present invention will be described with reference to FIGS. 1-5.

Figure 1:
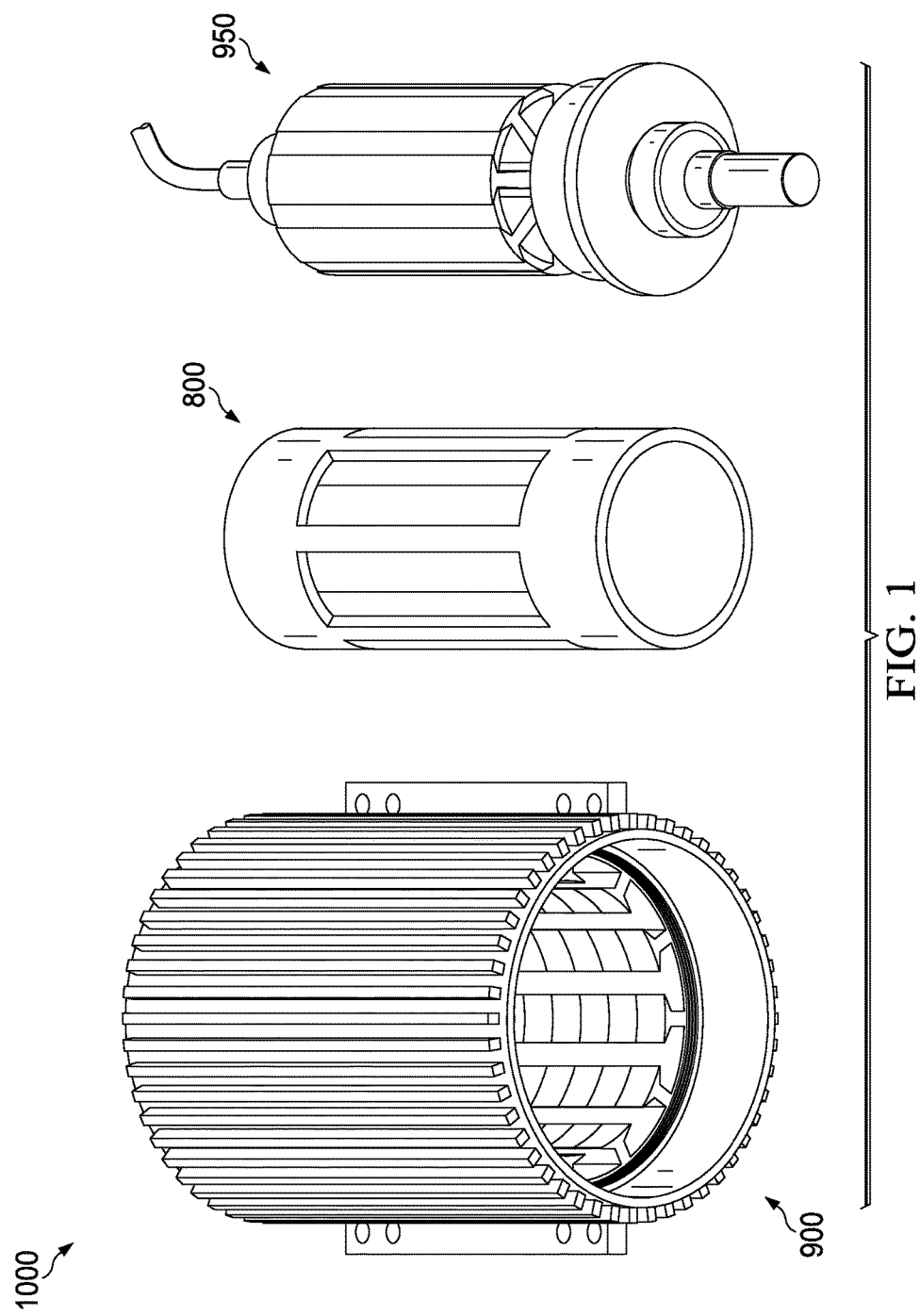
FIG. 1 is a perspective view of a preferred embodiment.
Figure 2:
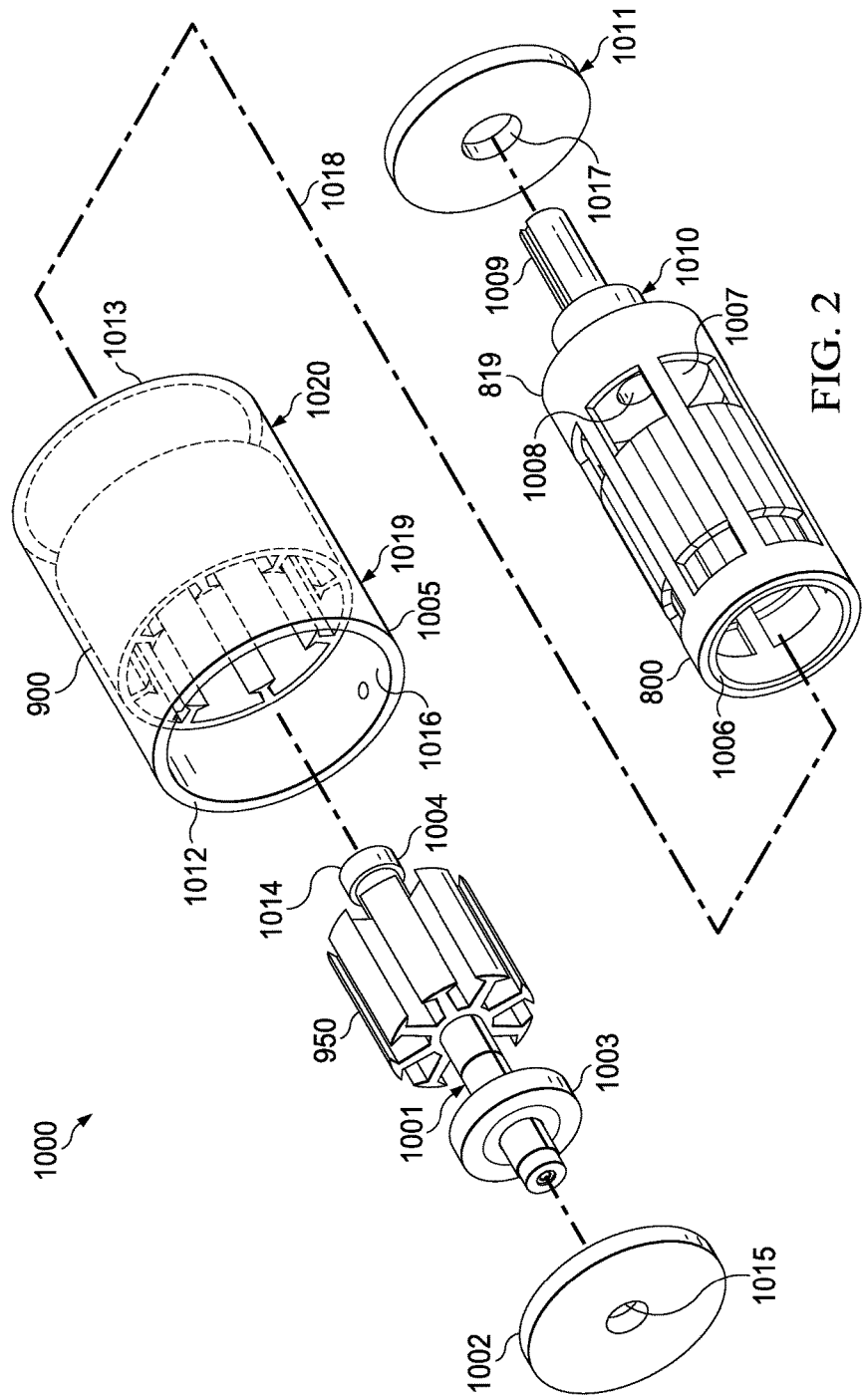
FIG. 2 is an exploded isometric view of a preferred embodiment.

Referring to FIGS. 1 and 2, double stator permanent magnet machine 1000 includes inner stator 950, rotor 800, and outer stator 900. In a preferred embodiment, each of inner stator 950, rotor 800, and outer stator 950 is cylindrical in shape. Inner stator 950 is disposed at the axis of double stator permanent magnet machine 1000 and rotor 800 is generally cylindrical and coaxial with inner stator 950. Outer stator 900 is generally cylindrical and is coaxial with inner stator 950. Each of inner stator 950, rotor 800, and outer stator 900 are coaxial.

In other embodiments, additional layers comprising pairs of rotors and stators may be added to the above-described stator-rotor-stator configuration.

Referring to FIG. 2, inner stator 950 is attached to inner stator shaft 1001. End cap 1002 is attached to inner stator shaft 1001 at end 1015. Bearings 1003 attach to inner stator shaft 1001 at end 1015 between end cap 1002 and inner stator 950. Bearings 1004 attach to inner stator shaft 1001 at end 1014.

Outer stator 900 is attached to inside surface 1016 of housing 1005. End cap 1015 is attached to housing 1005 at end 1012.

Rotor 800 includes outer cage 819 and a set of segments, each segment is attached to outer cage 819 as will be further described below in FIG. 3. Rotor 800 is attached to rotor end cap 1007. Rotor end cap 1007 has opening 1008 and shaft 1009. Bearings 1010 attach to shaft 1009. End cap 1011 has hole 1017 and attaches to housing 1005 at end 1013 and to bearings 1010 with hole 1017. Shaft 1009 inserts through hole 1017.

Bearings 1004 are connected to opening 1008 of rotor end cap 1007 and bearings 1003 are connected to opening 1006 of rotor 800 enabling rotor 800 to rotatively couple to inner stator shaft 1001 and to end cap 1011. Rotor 800 rotates relative to inner stator 950 and outer stator 900 about axis 1018 while inner stator 950 and outer stator remain stationary as will be further described below.

End portion 1019 of housing 1005 is used to house portions of wiring, which are selectively energized in operation of double stator permanent magnet machine 1000, as will be further described below. End portion 1020 of housing 1005 is adapted for connecting a load to rotor 800 with shaft 1009. Either end portion 1019 or 1020 may be used for either of these functions.

In a preferred embodiment, each of bearings 1003, 1004, and 1010 is a needle bearing. Other suitable bearings known in the art may be employed.

Figure 3:
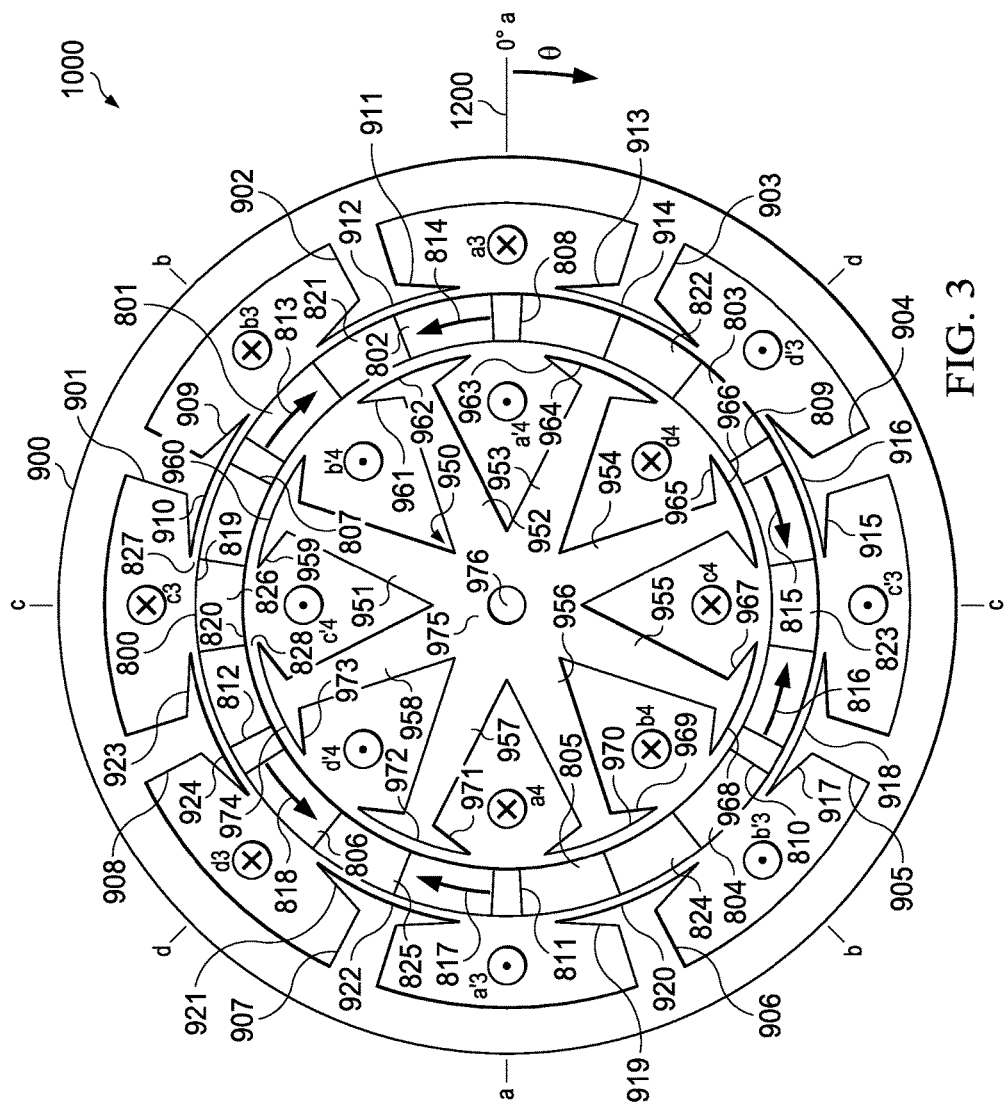
FIG. 3 is a cross-sectional view of a preferred embodiment.

Referring to FIG. 3, outer stator 900, rotor 800, and inner stator 950 will be described in further detail. Double stator permanent magnet machine 1000 includes outer stator 900, rotor 800, and inner stator 950 coaxial with center axis 976. Outer stator 900 has outer stator poles 901, 902, 903, 904, 905, 906, 907, and 908 spaced at equal outer angular intervals. Outer stator pole 901 has outer pole head 909 and outer pole surface 910. Outer stator pole 902 has outer pole head 911 and outer pole surface 912. Outer stator pole 903 has outer pole head 913 and outer pole surface 914. Outer stator pole 904 has outer pole head 915 and outer pole surface 916. Outer stator pole 905 has outer pole head 917 and outer pole surface 918. Outer stator pole 906 has outer pole head 919 and outer pole surface 920. Outer stator pole 907 has outer pole head 921 and outer pole surface 922. Outer stator pole 908 has outer pole head 923 and outer pole surface 924.

Each outer stator pole is aligned opposite a corresponding inner stator pole. Inner stator 950 includes back iron 975 and inner stator poles 951, 952, 953, 954, 955, 956, 957, and 958 spaced at equal inner angular intervals, each connected to and radially extending from back iron 975. Inner stator pole 951 has inner pole head 959 and inner pole surface 960. Inner stator pole 952 has inner pole head 961 and inner pole surface 962. Inner stator pole 953 has inner pole head 963 and inner pole surface 964. Inner stator pole 954 has inner pole head 965 and inner pole surface 966. Inner stator pole 955 has inner pole head 967 and inner pole surface 968. Inner stator pole 956 has inner pole head 969 and inner pole surface 970. Inner stator pole 957 has inner pole head 971 and inner pole surface 972. Inner stator pole 958 has inner pole head 973 and inner pole surface 974.

Rotor 800 includes segments 801, 802, 803, 804, 805, and 806 attached to outer cage 819 and evenly spaced with respect to each other in outer cage 819. Outer cage 819 includes cage segments 821, 822, 823, 824, 825, and 826 to which segments 801, 802, 803, 804, 805, and 806 attach as will be further described below. Segment 801 has permanent magnet 807 centered within segment 801. Permanent magnet 807 has polarity 813. Segment 801 is attached to cage segments 826 and 821. Segment 802 has permanent magnet 808 centered within segment 802. Permanent magnet 808 has polarity 814. Segment 802 is attached to cage segments 821 and 822. Segment 803 has permanent magnet 809 centered within segment 803. Permanent magnet 809 has polarity 815. Segment 803 is attached to cage segments 822 and 823. Segment 804 has permanent magnet 810 centered within segment 804. Permanent magnet 810 has polarity 816. Segment 804 is attached to cage segments 823 and 824. Segment 805 has permanent magnet 811 centered within segment 805. Permanent magnet 811 has polarity 817. Segment 805 is attached to cage segments 824 and 825. Segment 806 has permanent magnet 812 centered within segment 806. Permanent magnet 812 has polarity 818. Segment 806 is attached to cage segments 825 and 826. Each of permanent magnets 807, 808, 809, 810, 811, and 812 has a tangential magnetization. Each of polarities 813, 814, 815, 816, 817, and 818 is a north pole.

In preferred embodiments, rotor 800 is a shell-type or drum rotor. Segments 801, 802, 803, 804, 805, and 806 are formed so as not to project radially outward or inward from outer cage 819, i.e., are formed as arcuate portions of rotor 800. The radially outer surface of each segment is flush or substantially flush with the radially outer surface of outer cage 819. The radially inner surface of each segment is flush or substantially flush with the radially the inner surface of outer cage 819.

In a preferred embodiment, each of inner stator poles 951, 952, 953, 954, 955, 956, 957, and 958, outer stator poles 901, 902, 903, 904, 905, 906, 907, and 908, and segments 801, 802, 803, 804, 805, and 806 is formed as a portion extended in the direction of center axis 976. In this regard, the terms "stack length" or "axial length," used with reference to center axis 976 of double stator permanent magnet machine 1000, inner stator 950, rotor 800, or outer stator 900, refer herein to the length of the portion of double stator permanent magnet machine 1000, inner stator 950, outer stator 900, or rotor 800 that participates in electromechanical energy conversion, not the entire length of double stator permanent magnet machine 1000, inner stator 950, outer stator 900, or rotor 800. The term "length" will be used to refer to the entire length of double stator permanent magnet machine 1000, inner stator 950, outer stator 900, or rotor 800.

Each of inner stator poles 951, 952, 953, 954, 955, 956, 957, and 958, outer stator poles 901, 902, 903, 904, 905, 906, 907, and 908, and segments 801, 802, 803, 804, 805, and 806 is formed as a single portion extending along the entire stack length of double stator permanent magnet machine 1000. The respective cross-sections of inner stator poles 951, 952, 953, 954, 955, 956, 957, and 958, outer stator poles 901, 902, 903, 904, 905, 906, 907, and 908, and segments 801, 802, 803, 804, 805, and 806 remain the same throughout the respective stack lengths of inner stator 950, outer stator 900 and rotor 800. The stack lengths of double stator permanent magnet machine 1000, inner stator 950, outer stator 900, and rotor 800 extend most of the lengths of double stator permanent magnet machine 1000, inner stator 950, outer stator 900, and rotor 800, respectively.

Rotor 800 is positioned between outer stator 900 and inner stator 950 forming air gap 827 between rotor 800 and outer pole surfaces 910, 912, 914, 916, 918, 920, 922, and 924, and forming air gap 828 between rotor 800 and inner pole surfaces 960, 962, 964, 966, 968, 970, 972, and 974.

Double stator permanent magnet machine 1000 includes four phases, a, b, c, and d. Phase a includes windings $a_3$, $a'_3$, $a_4$, and $a'_4$ connected in series. Phase b includes windings $b_3$, $b'_3$, $b_4$, and $b'_4$ connected in series. Phase c includes windings $c_3$, $c'_3$, $c_4$, and $c'_4$ connected in series. Phase d includes windings $d_3$, $d'_3$, $d_4$, and $d'_4$ connected in series.

In a preferred embodiment, double stator permanent magnet machine 1000 has four phases. In other embodiments, double stator permanent magnet machine 1000 can have any number of phases depending on the desired design.

Windings $a_3$ are disposed between outer stator poles 903 and 902 having a proximal-distal current flow. Windings $b_3$ are disposed between outer stator poles 902 and 901 having a proximal-distal current flow. Windings $c_3$ are disposed between outer stator poles 901 and 908 having a proximal-distal current flow. Windings $d_3$ are disposed between outer stator poles 908 and 907 having a proximal-distal current flow. Windings $a'_3$ are disposed between outer stator poles 907 and 906 having a distal-proximal current flow. Windings $b'_3$ are disposed between outer stator poles 906 and 905 having a distal-proximal current flow. Windings $c'_3$ are disposed between outer stator poles 905 and 904 having a distal-proximal current flow. Windings $d'_3$ are disposed between outer stator poles 904 and 903 having a distal-proximal current flow.

Windings $a_4$ are disposed between inner stator poles 957 and 956 having a proximal-distal current flow. Windings $b_4$ are disposed between inner stator poles 956 and 955 having a proximal-distal current flow. Windings $c_4$ are disposed between inner stator poles 955 and 954 having a proximal-distal current flow. Windings $d_4$ are disposed between inner stator poles 954 and 953 having a proximal-distal current flow. Windings $a'_4$ are disposed between inner stator poles 953 and 952 having a distal-proximal current flow. Windings $b'_4$ are disposed between inner stator poles 952 and 951 having a distal-proximal current flow. Windings $c'_4$ are disposed between inner stator poles 951 and 958 having a distal-proximal current flow. Windings $d'_4$ are disposed between inner stator poles 958 and 957 having a distal-proximal current flow. As shown, the general direction of current flow of windings $a_3$, $a'_3$, $a_4$, and $a'_4$, $b_3$, $b'_3$, $b_4$, and $b'_4$, $c_3$, $c'_3$, $c_4$, and $c'_4$, $d_3$, $d'_3$, $d_4$, and $d'_4$ is a positive current flow. Reversing the current flows in windings $a_3$, $a'_3$, $a_4$, and $a'_4$, $b_3$, $b'_3$, $b_4$, and $b'_4$, $c_3$, $c'_3$, $c_4$, and $c'_4$, $d_3$, $d'_3$, $d_4$, and $d'_4$ is a negative current flow.

In a preferred embodiment, the windings of each phase are electrically isolated from each other. In this embodiment, windings $a_3$, $a'_3$, $a_4$, and $a'_4$ are electrically isolated from windings $b_3$, $b'_3$, $b_4$, and $b'_4$, windings $c_3$, $c'_3$, $c_4$, and $c'_4$ and windings $d_3$, $d'_3$, $d_4$, and $d'_4$. In this embodiment, windings $b_3$, $b'_3$, $b_4$, and $b'_4$, are electrically isolated from windings $a_3$, $a'_3$, $a_4$, and $a'_4$, windings $c_3$, $c'_3$, $c_4$, and $c'_4$, and windings $d_3$, $d'_3$, $d_4$, and $d'_4$. In this embodiment, windings $c_3$, $c'_3$, $c_4$, and $c'_4$ are electrically isolated from windings $a_3$, $a'_3$, $a_4$, and $a'_4$, windings $b_3$, $b'_3$, $b_4$, and $b'_4$, and windings $d_3$, $d'_3$, $d_4$, and $d'_4$. In this embodiment, windings $d_3$, $d'_3$, $d_4$, and $d'_4$ are electrically isolated from windings $a_3$, $a'_3$, $a_4$, and $a'_4$, windings $b_3$, $b'_3$, and $b'_4$, and windings $c_3$, $c'_3$, $c_4$, and $c'_4$.

In a preferred embodiment, rotor position θ is measured positively in the clockwise direction from x-axis 1200.

In a preferred embodiment, the number of inner stator poles is an even number and spaced at equal angular intervals about center axis 976.

In a preferred embodiment, the number of segments is an even number and spaced at equal angular intervals about center axis 976.

In a preferred embodiment, the number of outer stator poles is an even number and spaced at equal angular intervals about center axis 976.

In a preferred embodiment, given that the number of inner and outer stator poles is even and that inner and outer stator poles are spaced at equal angular or circumferential intervals, it follows that for any given pole of a given stator there will be another pole of the given stator at a position diametrically opposed to the given pole. That is, if a given pole of a given stator is positioned at, for example, 0 degrees, another pole of the given stator will be positioned at 180 degrees.

In a preferred embodiment, double stator permanent magnet machine 1000 has an 8/6/8 configuration, i.e., eight outer stator poles, six rotor segments, and eight inner stator poles, spaced at even intervals. In another embodiment, double stator permanent magnet machine 1000 has a 6/4/6 configuration. In another embodiment, double stator permanent magnet machine 1000 has a 10/8/10 configuration. In another embodiment, double stator permanent magnet machine 1000 has a 12/8/12 configuration. In another embodiment, double stator permanent magnet machine 1000 has a 16/12/16 configuration. Other configurations may be employed having the outer stator poles equal the number of inner stator poles.

In a preferred embodiment, segments 801, 802, 803, 804, 805, and 806 are positioned at intervals of 60° on center with respect to each other. In other configurations, other intervals are employed.

In a preferred embodiment, outer stator poles 901, 902, 903, 904, 905, 906, 907, and 908 are positioned at equal outer angular intervals of 45° with respect to each other. In other configurations, other outer angular intervals are employed.

In a preferred embodiment, each of outer pole surfaces 910, 912, 914, 916, 918, 920, 922, and 924 has an arc length of approximately 25°. In other configurations, other arc lengths are employed.

In a preferred embodiment, inner stator poles 951, 952, 953, 954, 955, 956, 957, and 958 are positioned at equal inner angular intervals of 45° with respect to each other. In other configurations, other inner angular intervals are employed.

In a preferred embodiment, each of inner pole surfaces 960, 962, 964, 966, 968, 970, 972, and 974 has an arc length of approximately 25°. In other configurations, other arc lengths are employed.

In a preferred embodiment, outer stator 900 is made of M-19 laminated electric silicon steel. Other grades of laminated electric silicon steel not exceeding M-49 may be employed.

In a preferred embodiment inner stator 950 is made of M-19 laminated electric silicon steel. Other grades of laminated electric silicon steel not exceeding M-49 may be employed.

In a preferred embodiment, each of segments 801, 802, 803, 804, 805, and 806 is made of M-19 laminated electric silicon steel. Other grades of laminated electric silicon steel not exceeding M-49 may be employed.

In a preferred embodiment, each of permanent magnets 807, 808, 809, 810, 811, and 812 is a rare earth magnet having a relative permeability approximately close to that of air having a relative permeability of approximately 1.00000037. In one embodiment, each of the permanent magnets 807, 808, 809, 810, 811, and 812 is made of neodymium having a relative permeability of approximately 1.05. In another embodiment, each of permanent magnets 807, 808, 809, 810, 811, and 812 is made of samarium-cobalt having a relative permeability of approximately 1.05. In another embodiment, each of permanent magnets 807, 808, 809, 810, 811, and 812 is made of a ceramic. In another embodiment, each of permanent magnets 807, 808, 809, 810, 811, and 812 is made of a ferrite. In another embodiment, each of permanent magnets 807, 808, 809, 810, 811, and 812 is a non-rare earth magnet.

In a preferred embodiment, windings $a_3$, $a'_3$, $a_4$, and $a'_4$, $b_3$, $b'_3$, $b_4$, and $b'_4$, $c_3$, $c'_3$, $c_4$, and $c'_4$, $d_3$, $d'_3$, $d_4$, and $d'_4$ are made of copper. Other suitable conductive materials known in the art may be employed.

In a preferred embodiment, each of air gaps 827 and 828 is approximately 1.0 mm.

Figure 4:
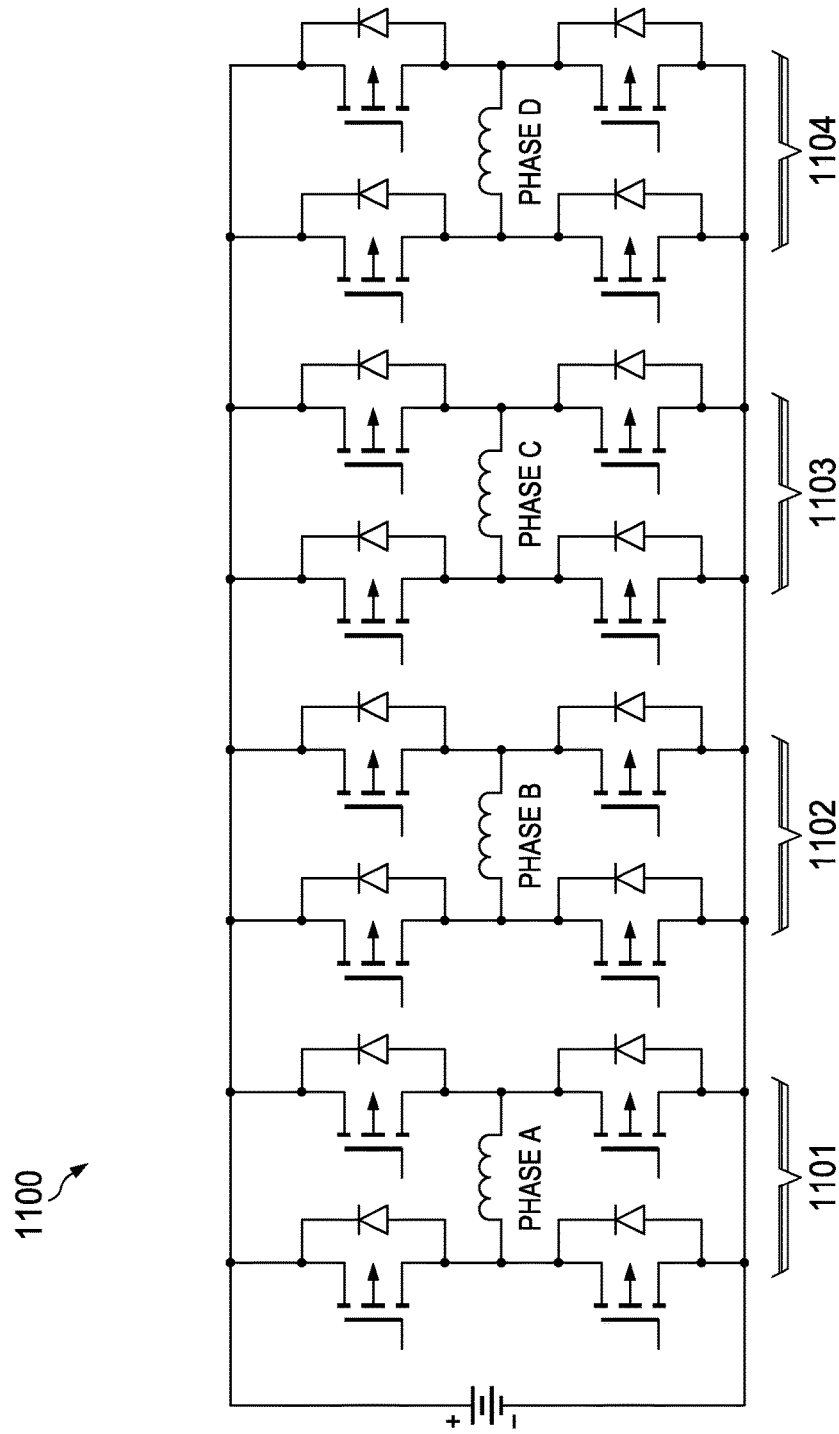
FIG. 4 is a schematic of a drive circuit of a preferred embodiment.

Referring to FIG. 4, circuit 1100 drives double stator permanent magnet machine 1000. Circuit 1100 includes bridge converters 1101, 1102, 1103, and 1104 controlling phases a, b, c, and d, respectively.

In a preferred embodiment, each of bridge converters 1101, 1102, 1103, and 1104 is a full bridge converter providing both positive and negative current.

In another embodiment, each of bridge converters 1101, 1102, 1103, and 1104 is a half bridge converter, each having independent control of each phase current magnitude and direction.

The operation of a double stator permanent magnet machine according to preferred embodiments will be described with reference to FIGS. 5-9.

In a preferred embodiment, double stator permanent magnet machine 1000 is configured to operate with three or more separately excitable phases.

Figure 5:
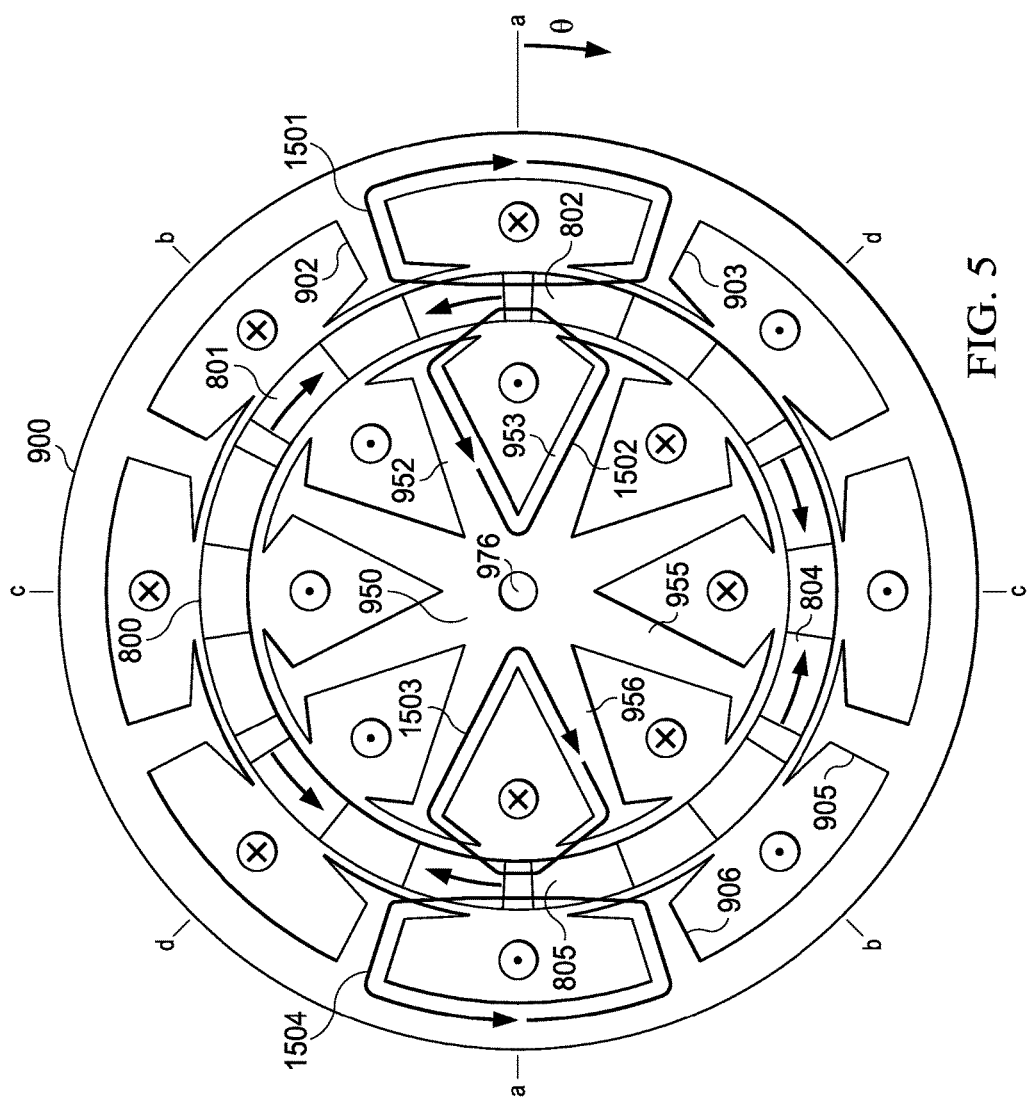
FIG. 5 is a cross-sectional view of a preferred embodiment in use.

Referring to FIG. 5, double stator permanent magnet machine 1000 is configured to operate with four separately excitable phases a, b, c, and d. Electromagnetic torque is generated by the tendency of the magnetic circuit to realize the configuration of minimum magnetic reluctance (resistance). When a given phase is excited by causing a current to flow through the windings of that phase, a set of opposed segments nearest the energized windings are attracted thereto, and thus align themselves respectively with the pairs of stator poles between which the windings are disposed into an aligned position. In this aligned position, the reluctance is at a minimum. Since the number of segments is not equal to the number of poles of either stator, when the set of opposed segments are aligned with pairs of stator poles, a second set of opposed segments will be in an unaligned position. Exciting the phase adjacent to the unaligned segments will cause those segments to align themselves respectively with the pairs of stator poles of that adjacent phase, since reluctance is at a maximum in the unaligned position. By successively energizing adjacent phases, rotor 800 is caused to rotate while generating torque. The successive energizing of different phases involves the switching of current into different stator windings as reluctance varies. When reluctance is at a minimum, inductance is at a maximum, and vice versa. Multiphase excitation can be implemented by currents injected in multiple phases simultaneously to increase torque production.

Still referring to FIG. 5 by way of example, when the windings of phase a are energized, segments 802 and 805 are pulled into alignment with a stator pole set of phase a including inner stator poles 953 and 952 and outer stator poles 903 and 902 by rotating clockwise into the aligned position as shown. Phase a generates magnetic flux paths 1501, 1502, 1503, and 1504. Phase b is then excited. When the excitation of phase b begins, segments 804 and 801 will be in the half-aligned position as shown. When the windings of phase b are energized segments 804 and 801 are pulled clockwise into alignment with a stator pole set of phase b including inner stator poles 955 and 956 and outer stator poles 905 and 906. By continuing to energize each adjacent phase in counterclockwise succession, rotor 800 is made to rotate in the clockwise direction.

In another embodiment, energizing adjacent phases in a clockwise succession will cause rotor 800 to rotate counterclockwise.

In a preferred embodiment, the phases of double stator permanent magnet machine 1000 are sequentially energized. In this embodiment, double stator permanent magnet machine 1000 is operated as a motor, generating positive torque. In this embodiment, a given phase is energized when the opposing segments nearest the windings to be energized, are in an unaligned position or shortly thereafter, and the given phase is turned off, i.e., the windings corresponding to the phase are deenergized, just before the segments align with the set of inner and outer stator poles surrounding the phase.

In order to operate as a motor, stator phase excitation needs to be synchronized with the rotor position. A discrete encoder or resolver will perform the functionality. However, as the position information is also encoded in the inductance profile and induced back EMF, a position sensorless method can be developed as long as there is access to the applied phase current and voltage.

In another embodiment, double stator permanent magnet machine 1000 is operated as a generator. In this embodiment, external torque is applied. In this embodiment, a given phase produces a current pulse while the segments nearest the windings to be energized are brought into an aligned position or shortly thereafter. The given phase may then be deenergized, i.e., the windings corresponding to the phase may be switched off, just before the segments reach a fully unaligned position relative to the stator pole set surrounding the given phase.

In a preferred embodiment, $\theta=0°$ is defined as the aligned position, $\theta=15°$ is defined as the half-aligned position, and $\theta=30°$ is defined as the unaligned position for double stator permanent magnet machine 1000.

The geometry of double stator permanent magnet machine 1000 enables shortened magnetic flux paths 1501, 1502, 1503, and 1504 generated by the energizing of the phases as compared to a switched reluctance machine of the prior art.

In use, torque is generated by double stator permanent magnet machine 1000 through selectively energizing the windings disposed between inner stator poles and outer stator poles of phases a, b, c, and d with current using circuit 1100, thereby causing rotor 800 to rotate with respect to outer stator 900 and inner stator 950. The energizing of the windings disposed between inner stator poles of inner stator 950 and outer stator poles of outer stator 900 for a phase is synchronized with the position, $\theta$, of rotor 800.

For each given phase, the terminal voltage is defined by:

$$V_a = Ri_a + E_a = Ri_a + \frac{d\phi_a}{dt} \quad (1)$$

where, R is the resistance for the given phase, $i_a$ is current for the given phase, $E_a$ is the induced back EMF for the given phase, and $\phi_a$ is the flux linkage for the given phase. The flux linkage $\phi_a$ for the given phase is defined as:

$$\phi_a = L_{aa}(\theta_r)i_a + \psi_{pm\_a}(\theta_r) + M_{ab}(\theta_r)i_b + M_{ac}(\theta_r)i_c + M_{ad}(\theta_r)i_d \quad (2)$$

where $L_{aa}$ is the self inductance in the given phase, $\psi_{pm}$ is the flux linkage caused by the permanent magnet, $M_{ab}$, $M_{ac}$, $M_{ad}$ are the mutual inductances between the phases, $i_b$, $i_c$, $i_d$ are the phase currents for phases b, c, d, respectively, and $\theta_r$ is the angular position of rotor 800 for the given phase. Because the mutual inductance between each phase is an order of magnitude smaller than the self inductance, the interaction between each phase is neglected resulting in the flux linkage for the given phase defined as:

$$\phi_a = L_{aa}(\theta_r)i_a + \psi_{pm\_a}(\theta_r) \quad (3)$$

As a result, the induced back EMF for the given phase is defined as:

$$E_a = \frac{dL_{aa}(\theta r)i_a}{dt} + \frac{d\psi_{pm\_a}(\theta_r)}{dt} \quad (4)$$

$$= i_a \frac{dL_{aa}(\theta_r)}{dt} + \frac{dL_{aa}(\theta_r)i_a}{dt} + \frac{d\psi_{pm\_a}(\theta_r)}{dt}$$

$$= i_a \frac{dL_{aa}(\theta_r)}{d\theta r}\omega_r + L_{aa}(\theta_r)\frac{di_a}{dt} + \frac{d\psi_{pm\_a}(\theta_r)}{d\theta r}\omega_r \quad (5)$$

Using equation (5), the electromagnetic power for the given phase is defined by:

$$P = i_a E_a \quad (6)$$

$$= i_a \left( i_a \frac{dL_{aa}(\theta_r)}{d\theta r}\omega_r + L_{aa}(\theta_r)\frac{di_a}{dt} + \frac{d\psi_{pm\_a}(\theta_r)}{d\theta r}\omega_r \right)$$

$$= i_a^2 \frac{dL_{aa}(\theta_r)}{d\theta r}\omega_r + i_a L_{aa}(\theta_r)\frac{di_a}{dt} + i_a \frac{d\psi_{pm\_a}(\theta_r)}{d\theta r}\omega_r$$

$$= \frac{1}{2}\left( i_a^2 \frac{dL_{aa}(\theta_r)}{d\theta_r}\omega_r + i_a^2 \frac{dL_{aa}(\theta_r)}{dt} + 2i_a L_{aa}(\theta_r)\frac{di_a}{dt} \right) + i_a \frac{d\psi_{pm\_a}(\theta_r)}{d\theta r}\omega_r$$

$$= \frac{d\left(\frac{1}{2}L_{aa}(\theta_r)i_a^2\right)}{dt} + \left( \frac{1}{2}i_a^2 \frac{dL_{aa}(\theta_r)}{d\theta_r} + i_a \frac{d\psi_{pm\_a}(\theta_r)}{d\theta_r} \right)\omega_r$$

where $\omega_r$ is the angular frequency of rotor 800, and $$\frac{d\left(\frac{1}{2}L_{aa}(\theta_r)i_a^2\right)}{dt}$$

in equation (6) is the reactive power because $$\frac{d\left(\frac{1}{2}L_{aa}(\theta_r)i_a^2\right)}{dt}$$

refers to variation of the energy stored in the field. The reactive power is not consumed by double stator permanent magnet machine 1000. The reactive power cycles between the power supply and double stator permanent magnet machine 1000. The second term, $$\left( \frac{1}{2}i_a^2 \frac{dL_{aa}(\theta_r)}{d\theta_r} + i_a \frac{d\psi_{pm\_a}(\theta_r)}{d\theta_r} \right)\omega_r,$$

is the active power converted to mechanical energy by double stator permanent magnet machine 1000. Dividing the active power by the angular frequency of rotor 800, the torque for the given phase is defined by:

$$T = \frac{1}{2}i_a^2 \frac{dL_{aa}(\theta_r)}{d\theta_r} + i_a \frac{d\psi_{pm\_a}(\theta_r)}{d\theta_r} \quad (7)$$

The total torque generated by double stator permanent magnet machine 1000 includes two sources of torque: reluctance torque, $$\frac{1}{2}i_a^2 \frac{dL_{aa}(\theta_r)}{d\theta_r},$$

and reaction torque, $$i_a \frac{d\psi_{pm\_a}(\theta_r)}{d\theta_r}.$$

These two sources of torque can be either additive or subtractive depending on the operation mode.

The reluctance torque is determined by the magnitude of the current and the inductance variation over rotor position. The direction of the reluctance torque is determined by the differentiation of inductance over rotor position.

The reaction torque direction depends on the flux linkage variation and the current direction. The reaction torque magnitude is linearly related to the current magnitude and the flux variation of the permanent magnet provided that no saturation is present. If the flux linkage differentiation is positive, positive current will result in positive torque. If the flux linkage differentiation is negative, negative current will result in positive torque. The positive reaction torque is generated regardless of inductance slope. Positive torque can be produced over the entire electrical cycle.

In a preferred embodiment, the total torque generated by double stator permanent magnet machine 1000 is a ratio of at least 1:3, reluctance torque to reaction torque.

Figure 6:
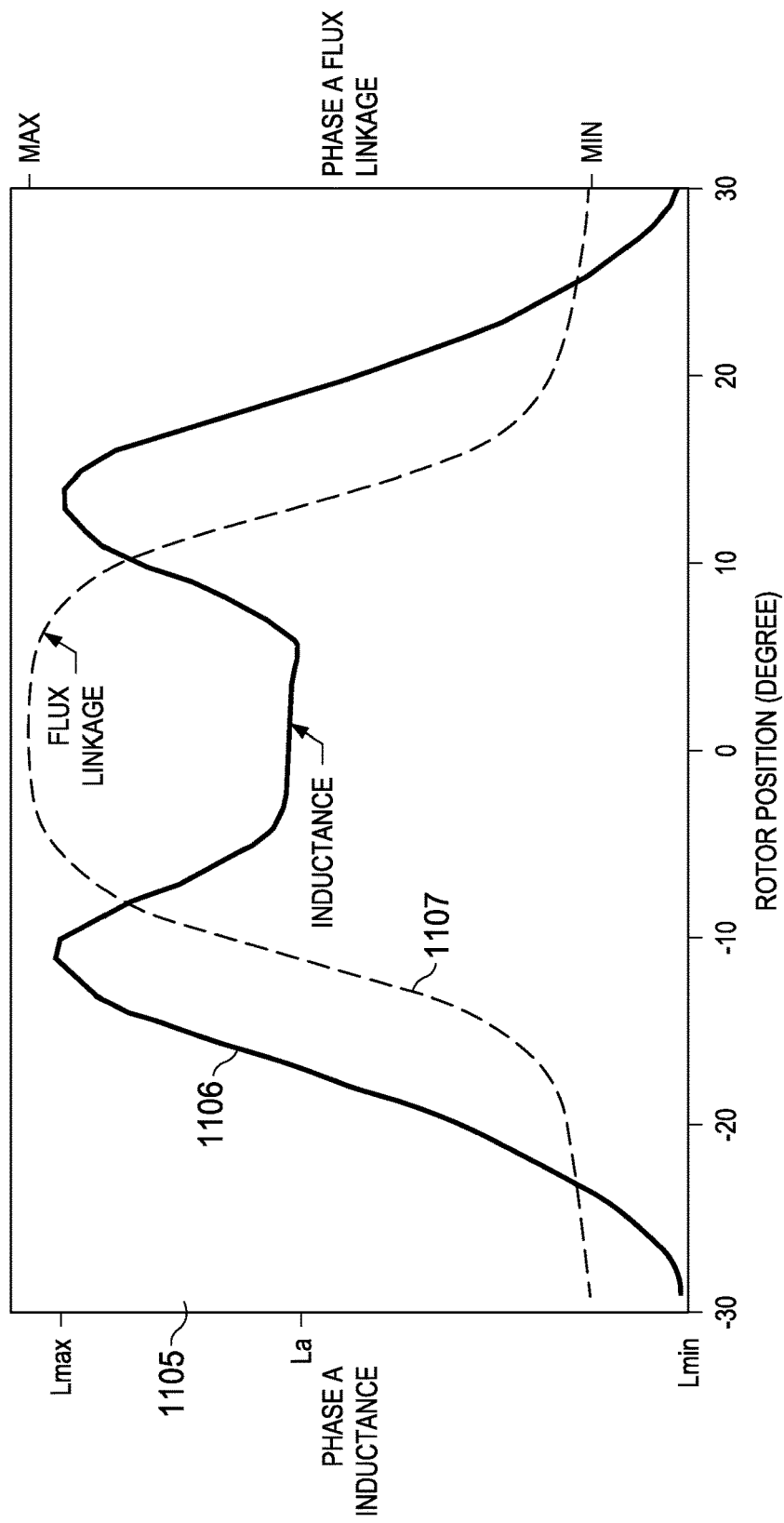
FIG. 6 is a graph of the inductance and the flux linkage of phase a with respect to a rotor position of a preferred embodiment.

Referring to FIG. 6, inductance profile 1106 and flux linkage profile 1107 of phase a are overlaid as two plots in graph 1105 which plots the profiles between the rotor positions of −30° to 30°. Phases b, c, and d have the same waveform of inductance profile over rotor position with a fixed angle shift between each phase. Flux linkage profile 1107 is the same as the flux linkage profile plotted in FIG. 8 as will be described below, viewed over a narrow window of rotational positions.

Inductance profile 1106 has an inductance dip when the permanent magnet aligns with the center of the phase a windings at 0°. When the rotor moves from a completely unaligned position near −30° to where first half of rotor segment aligns with the stator at about −12°, the inductance increases to a maximum at about −12°. Since the permanent magnet material has a relative permeability very close to air, the equivalent airgap length will increase until about −5° after which it remains constant, the inductance decreases to a minimum at about −5° where the permanent magnet is between stator poles. The equivalent airgap length remains constant and the inductance remains constant between about −5° and +5°. The inductance increases to the maximum value at about 12° since the second half of rotor segment is fully aligned with stator at about +12°. The inductance will decrease again when the second half of rotor segment rotates away from the aligned position, towards +30°.

Figure 7:
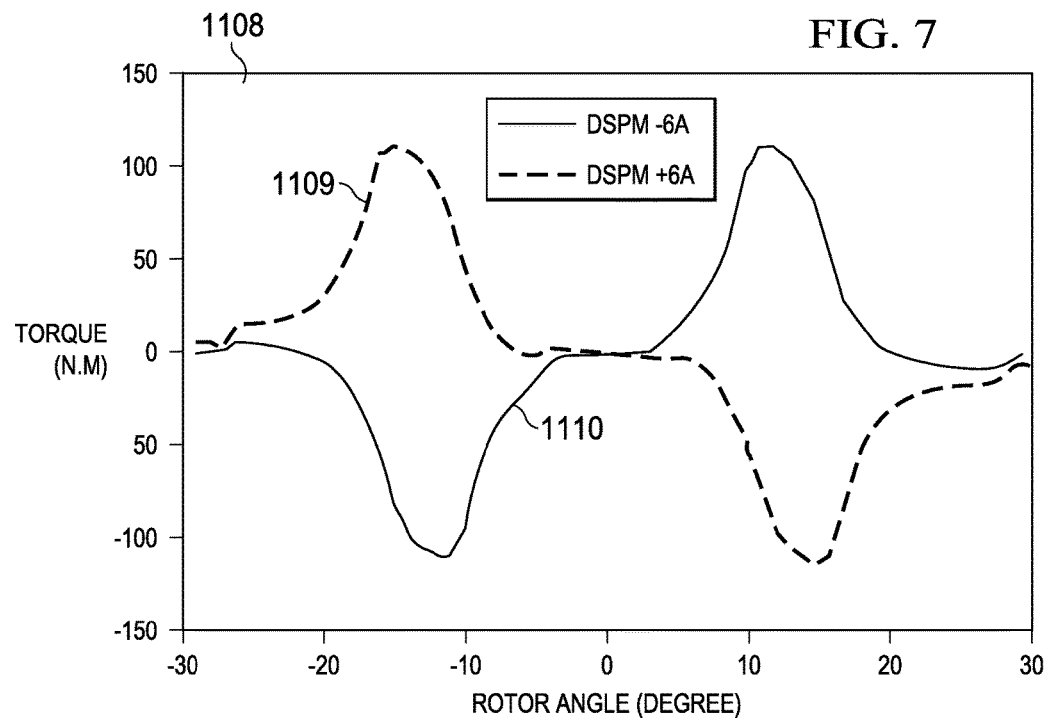
FIG. 7 is a graph of the torque of phase a with respect to a rotor position of a preferred embodiment.

Referring to FIG. 7, graph 1108 of torque versus rotor position is provided. Curve 1109 is the torque profile produced by a first applied current and curve 1110 is the torque profile produced by a second applied current with a polarity opposite to the first applied current. The torque is only plotted for rotational positions between −30° and +30°. The profiles shown are periodically repeated every 60° throughout the remainder of the rotational positions.

FIG. 7 indicates that when positive torque is desired, the machine can be excited by an appropriate polarity of current for half of the electrical cycle. By switching the polarity of the current at −30°, 0°, +30° and so forth, positive torque can be generated in the entire electrical cycle. This effectively boosts the torque generated by a factor of two. The net reluctance torque is approximately zero, contributing only to torque ripple.

Figure 8:
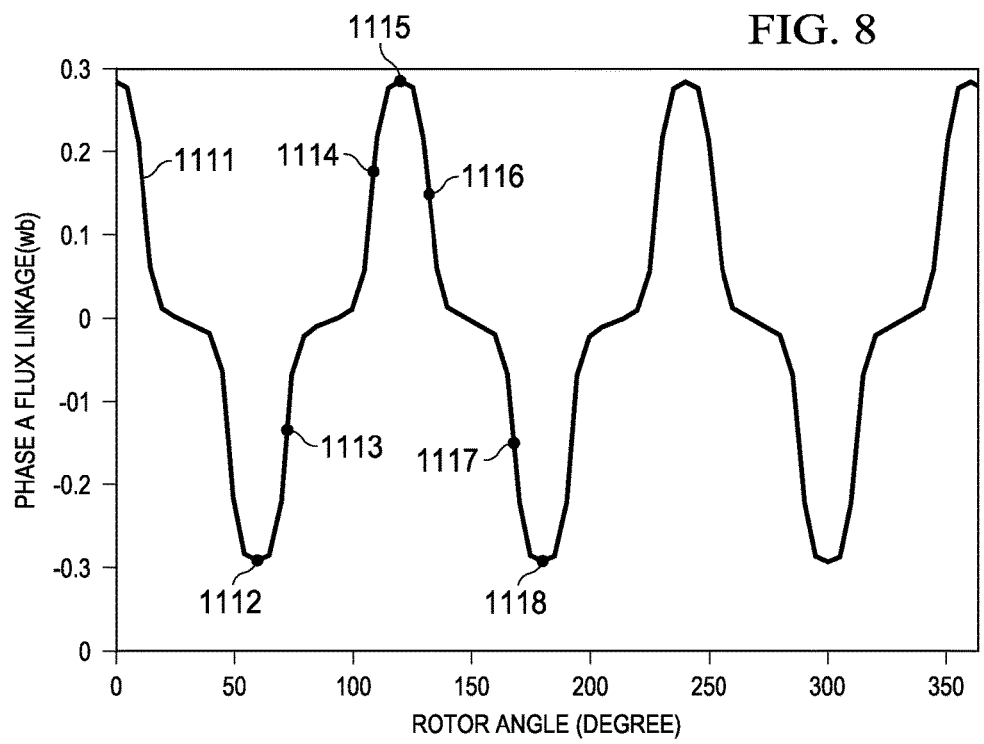
FIG. 8 is a graph of the flux linkage of phase a with respect to a rotor position of a preferred embodiment.

Referring to FIG. 8 by way of example, flux linkage variation 1111 versus the position of rotor 800 for phase a is shown. This relationship of flux linkage variation 1111 versus rotor position is the same for each phase, with a fixed angle shift between each phase, and thereby current is applied to the windings of each phase in the same manner.

In one embodiment, current is applied to the windings of each phase when the flux linkage for each phase increases and decreases, fully utilizing reaction torque. In this embodiment, for a period beginning at point 1112 a first current is applied to the windings of each phase as the flux linkage increases through points 1113 and 1114, until the flux linkage peaks at point 1115. During this half-period from point 1112 to point 1115, the reluctance torque is positive and the first current applied is positive. As the flux linkage peaks at point 1115 and decreases through points 1116 and 1117 until the flux linkage bottoms out at point 1116, a second current, opposite in polarity from the first current, is applied to the windings of each phase. During this half-period from point 1115 to point 1118, the reluctance torque is negative and the second current applied is negative. During a full period, the net reluctance torque is zero, only contributing to torque ripple.

In another embodiment, current is only applied to the windings of each phase as the flux linkage increases. In this embodiment, for a period beginning at point 1112 a first current is applied to the windings of each phase as the flux linkage increases through points 1113 and 1114, until the flux linkage peaks at point 1115. During this half-period from point 1112 to point 1115, the reluctance torque is positive and the first current applied is positive. As the flux linkage peaks at point 1115 and decreases through points 1116 and 1117 until the flux linkage bottoms out at point 1118, no current is applied to the windings of each phase.

Figure 9:
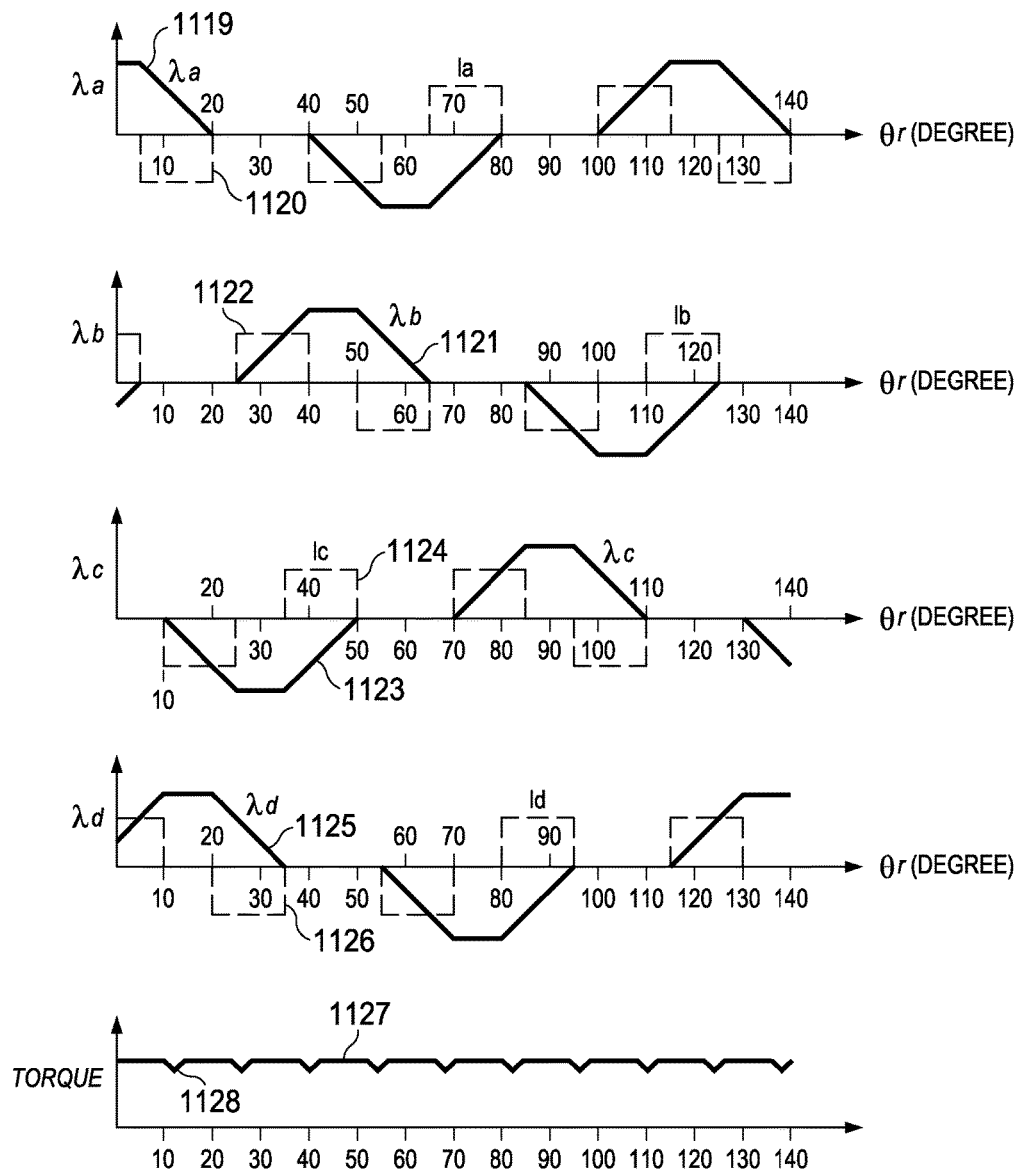
FIG. 9 is a graph of the current and flux linkage for each phase, and the torque for all phases of a preferred embodiment.

Referring to FIG. 9 in one embodiment, the current sequence in relation to the flux linkage for each phase of double stator permanent magnet machine 1000 is shown. Curve 1119 is the flux linkage for phase a. Curve 1120 is the current applied in phase a. Curve 1121 is the flux linkage in phase b. Curve 1122 is the current applied in phase b. Curve 1123 is the flux linkage in phase c. Curve 1124 is the current applied in phase c. Curve 1125 is the flux linkage in phase d. Curve 1126 is the current applied in phase d. In this embodiment, as the flux increases for each phase, a first positive current is applied to the respective phase windings. For each phase, as the flux linkage decreases a second negative current is applied to the respective phase windings. When the flux linkage plateaus for each phase, no current is applied.

In this embodiment, when phases a, b, c, and d are excited, torque curve 1127 is produced that includes torque ripples 1128 in flat areas of flux linkage due to reluctance torque.

In another embodiment, a first positive current is applied to the respective phase windings only as the flux increases for each phase. No negative current is applied. In this embodiment, curves 1120, 1122, 1124, and 1126, will only have a positive portion.

In one embodiment, approximately 6 A is applied to the windings of each phase when the flux linkage increases in each phase and approximately −6 A is applied to the windings of each phase when the flux linkage decreases in each phase. Other amounts of current are applied for other configurations and torque requirements.

In another embodiment, approximately 6 A is applied to the windings of each phase only when the flux linkage increases in each phase. Other amounts of current are applied for other configurations and torque requirements.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A double stator permanent magnet machine comprises:
    an inner stator, further comprising a back iron and a set of inner stator poles connected to the back iron;
    a rotor, further comprising an outer cage and a shaft connected to the outer cage, rotatively coupled to the inner stator;
    a set of segments, each segment further comprising a permanent magnet, connected to the outer cage;
    a first segment of the set of segments including a first permanent magnet with a polarity that is substantially tangential to a direction of motion the rotor;
    an outer stator, further comprising a set of outer stator poles, rotatively coupled to the rotor;
    a set of inner stator windings disposed between each of the inner stator poles;
    a set of outer stator windings disposed between each of the outer stator poles;
    a set of phases, each phase further comprising a subset of the set of inner stator windings and a subset of the set of outer stator windings; and,
    whereby the rotor rotates with respect to the inner stator and the outer stator, a reluctance torque is produced by the rotor and a reaction torque is produced by the rotor at a ratio of at least 1:3, when a current is selectively connected to the set of phases.

2. The double stator permanent magnet machine of claim 1, wherein the set of segments are spaced at a set of equal angular intervals.

3. The double stator permanent magnet machine of claim 1, wherein the set of inner stator poles are spaced at a set of equal inner angular intervals.

4. The double stator permanent magnet machine of claim 1, wherein the set of outer stator poles are spaced at a set of equal outer angular intervals.

5. The double stator permanent magnet machine of claim 1, wherein the set of outer stator poles and the set of inner stator poles are equal in number.

6. The double stator permanent magnet machine of claim 1, wherein each of the permanent magnets is a material selected from the group of neodymium, samarium-cobalt, ceramic, ferrite, and a non-rare earth magnet.

7. The double stator permanent magnet machine of claim 1, wherein the outer stator is laminated electric silicon steel.

8. The double stator permanent magnet machine of claim 1, wherein the inner stator is laminated electric silicon steel.

9. The double stator permanent magnet machine of claim 1, further comprising:
 a second segment of the set of segments including a second permanent magnet with a polarity that is substantially tangential to the direction of motion the rotor;
 a third segment of the set of segments including a third permanent magnet with a polarity that is substantially tangential to the direction of motion the rotor;
 the polarity of the first permanent magnet configured to point in a same direction as the direction of motion of the rotor;
 the polarity of the second permanent magnet configured to point in an opposite direction as the direction of motion of the rotor;
 the polarity of the third permanent magnet configured to point in the same direction as the direction of motion of the rotor;
 the set of outer stator poles equal in number to the set of inner stator poles; and,
 the number of outer stator poles and inner stator poles greater than a number of the set of segments.

10. The double stator permanent magnet machine of claim 1, further comprising:
 the set of phases including four phases;
 each of the four phases of the set of phases including:
  a first subset of outer stator windings of the set of outer stator windings,
  a second subset of outer stator windings of the set of outer stator windings,
  a first subset of inner stator windings of the set of inner stator windings, and
  a second subset of inner stator windings of the set of inner stator windings;
 wherein
  the first subset of outer stator windings of the set of outer stator windings of a first phase of the set of phases on a first side of a center axis of the double stator permanent magnet machine,
  the second subset of outer stator windings of the set of outer stator windings of the first phase on a second side of the center axis that is opposite to the first side,
  the first subset of inner stator windings of the set of inner stator windings of the first phase on the second side of the center axis and adjacent to the second subset of outer stator windings, and
  the second subset of inner stator windings of the set of inner stator windings of the first phase on the first side of the center axis and adjacent the first subset of outer stator windings
  are connected directly in series;
 the center axis of the double stator permanent magnet machine being central to the inner stator, the rotor, and the outer stator;
 the first subset of outer stator windings of the first phase of the set of phases between a first subset of two poles of the set of outer stator poles;
 the second subset of outer stator windings of the first phase of the set of phases between a second subset of two poles of the set of outer stator poles;
 the first subset of two poles of the set of outer stator poles on opposite sides of the center axis from the second subset of two poles of the set of outer stator poles;
 the first subset of inner stator windings of the first phase of the set of phases between a first subset of two poles of the set of inner stator poles;
 the second subset of inner stator windings of the first phase of the set of phases between a second subset of two poles of the set of inner stator poles;
 the first subset of two poles of the set of inner stator poles on opposite sides of the center axis from the second subset of two poles of the set of inner stator poles;
 the first subset of outer stator windings for each of the four phases of the set of phases having a proximal-distal positive current flow;
 the second subset of outer stator windings for each of the four phases of the set of phases having a distal-proximal positive current flow;
 the first subset of inner stator windings for each of the four phases of the set of phases having a proximal-distal positive current flow; and,
 the second subset of inner stator windings for each of the four phases of the set of phases having a distal-proximal positive current flow.

11. A double stator permanent magnet machine comprises:
 an inner stator, further comprising a back iron, a set of inner stator poles connected to and extending radially outward from the back iron spaced at a set of equal inner angular intervals, a set of inner stator windings disposed within the set of inner stator poles, and a first shaft;
 a rotor, further comprising a set of segments, an outer cage attached to the set of segments, and a second shaft connected to the outer cage, each segment of the set of segments further comprising a permanent magnet, rotatively connected to the inner stator;
 wherein the first shaft and the second shaft share a common axis;
 the first shaft fixed with respect to the common axis;
 the second shaft rotatable about the common axis;
 a first segment of the set of segments including a first permanent magnet with a polarity that is substantially tangential to a direction of motion the rotor;
 an outer stator, further comprising a set of outer stator poles spaced at a set of equal outer angular intervals and a set of outer stator windings disposed within the set of outer stator poles rotatively connected to the rotor;
 a set of phases, each phase further comprising a subset of the set of inner stator windings and a subset of the set of outer stator windings;
 wherein
  a first subset of outer stator windings of the set of outer stator windings of a first phase of the set of phases on a first side of a center axis of the double stator permanent magnet machine,
  a second subset of outer stator windings of the set of outer stator windings of the first phase on a second side of the center axis that is opposite to the first side,
  a first subset of inner stator windings of the set of inner stator windings of the first phase on the second side of the center axis and adjacent to the second subset of outer stator windings, and
  a second subset of inner stator windings of the set of inner stator windings of the first phase on the first side of the center axis and adjacent the first subset of outer stator windings are connected directly in series; and, wherein a current is selectively connected to the set of phases to effect a rotation of the rotor about the shaft.

12. The double stator permanent magnet machine of claim 11, wherein each of the set of outer stator poles corresponds to an inner stator pole of the set of inner stator poles.

13. The double stator permanent magnet machine of claim 11, wherein each phase of the set of phases is surrounded by an increasing flux linkage and a decreasing flux linkage.

14. The double stator permanent magnet machine of claim 13, wherein the current is a positive current and the current is connected to each phase at the increasing flux linkage.

15. The double stator permanent magnet machine of claim 13, wherein the current is a negative current and the current is connected to each phase at the decreasing flux linkage.

16. The double stator permanent magnet machine of claim 11, wherein the rotation has a reluctance torque and a reaction torque at a ratio of at least 1:3.

17. A method for operating a double stator permanent magnet machine comprising the steps of:
providing an inner stator, further comprising a back iron, a set of inner stator poles connected to the back iron, and a first shaft;
providing a rotor, further comprising an outer cage, a second shaft connected to the outer cage, and a set of segments connected to the outer cage, each segment further comprising a permanent magnet, rotatively coupled to the inner stator;
wherein the first shaft and the second shaft share a common axis;
the first shaft fixed with respect to the common axis;
the second shaft rotatable about the common axis;
providing a first segment of the set of segments including a first permanent magnet with a polarity that is substantially tangential to a direction of motion the rotor;
providing an outer stator, further comprising a set of outer stator poles, rotatively coupled to the rotor;
providing a set of inner stator windings disposed between each of the inner stator poles;
providing a set of outer stator windings disposed between each of the outer stator poles;
providing a set of phases, each phase further comprising a subset of the set of inner stator windings, a subset of the set of outer stator windings, and a flux linkage surrounding the subset of the set of inner stator windings and the subset of outer stator windings;
connecting directly in series:
a first subset of outer stator windings of the set of outer stator windings of a first phase of the set of phases on a first side of a center axis of the double stator permanent magnet machine,
a second subset of outer stator windings of the set of outer stator windings of the first phase on a second side of the center axis that is opposite to the first side,
a first subset of inner stator windings of the set of inner stator windings of the first phase on the second side of the center axis and adjacent to the second subset of outer stator windings, and
a second subset of inner stator windings of the set of inner stator windings of the first phase on the first side of the center axis and adjacent the first subset of outer stator windings; and,
selectively energizing the set of phases with a current.

18. The method of claim 17,
wherein the step of selectively energizing the set of phases with a current further comprises the step of synchronizing the energizing of the set of phases with a position of the rotor; and,
wherein the step of selectively energizing the set of phases with a current further comprises the step of sequentially energizing the set of phases with the current.

19. The method of claim 18, wherein the step of sequentially energizing the set of phases with the current further comprises the steps of:
energizing each phase with a first current as the flux linkage increases; and,
energizing each phase with a second current, opposite in polarity from the first current, as the flux linkage decreases.

20. The method of claim 18, wherein the step of sequentially energizing the set of phases with the current further comprises the step of energizing each phase with a first current as the flux linkage increases.

21. The method of claim 17, wherein the step of selectively energizing the set of phases with a current further comprises the steps of:
generating a reluctance torque and a reaction torque at a ratio of at least 1:3; and,
effecting one or more axial flux paths on each permanent magnet.

22. A double stator permanent magnet machine, comprising:
an inner stator, further comprising a back iron, a set of inner stator poles connected to the back iron, and a first shaft;
a rotor, further comprising an outer cage and a second shaft connected to the outer cage, rotatively coupled to the inner stator;
wherein the first shaft is fixed with respect to the back iron;
wherein the first shaft has a collinear axis with the second shaft;
wherein the second shaft is rotatable about the collinear axis;
a set of segments, each segment further comprising a permanent magnet, connected to the outer cage;
a first segment of the set of segments including a first permanent magnet with a polarity that is substantially tangential to a direction of motion the rotor;
an outer stator, having an end portion, further comprising a set of outer stator poles, rotatively coupled to the rotor;
wherein the end portion is rotationally coupled with the rotor and is adapted for connecting a load to the second shaft of the rotor;
a set of inner stator windings disposed between each of the inner stator poles;
a set of outer stator windings disposed between each of the outer stator poles;
a set of phases, each phase further comprising a subset of the set of inner stator windings and a subset of the set of outer stator windings; and,
whereby, when a current is selectively connected to the set of phases, one or more substantially axial flux paths are generated, the rotor rotates with respect to the inner stator and the outer stator, a reluctance torque is produced by the rotor, and a reaction torque is produced by the rotor at a ratio of at least 1:3.

* * * * *